(12) United States Patent
Blair et al.

(10) Patent No.: US 10,154,121 B2
(45) Date of Patent: Dec. 11, 2018

(54) CONTROL DEVICE, SYSTEM CONTAINING THE CONTROL DEVICE AND METHOD OF USING THE SAME

(71) Applicant: REVOLUTION DISPLAY, LLC, Glendale, CA (US)

(72) Inventors: Scott Blair, Austin, TX (US); Jeremy Hochman, Glendale, CA (US)

(73) Assignee: Revolution Display, LLC, Glendale, CA (US)

( * ) Notice: Subject to any disclaimer, the term of this patent is extended or adjusted under 35 U.S.C. 154(b) by 1336 days.

(21) Appl. No.: 13/972,675

(22) Filed: Aug. 21, 2013

(65) Prior Publication Data

US 2014/0094934 A1  Apr. 3, 2014

Related U.S. Application Data (60) Provisional application No. 61/707,761, filed on Sep. 28, 2012, provisional application No. 61/802,082, filed on Mar. 15, 2013.

(51) Int. Cl.
| | |
|---|---|
| G06F 15/16 | (2006.01) |
| H04L 29/06 | (2006.01) |
| G05B 15/02 | (2006.01) |
| G03B 21/14 | (2006.01) |
| G02B 26/08 | (2006.01) |
| G06F 11/32 | (2006.01) |

(Continued)

(52) U.S. Cl.
CPC ........... *H04L 69/18* (2013.01); *F21L 4/04* (2013.01); *G02B 26/0816* (2013.01); *G03B 17/00* (2013.01); *G03B 21/14* (2013.01); *G03B 21/208* (2013.01); *G05B 15/02* (2013.01); *G06F 11/324* (2013.01); *H04L 69/08* (2013.01); *H05B 37/0245* (2013.01)

(58) Field of Classification Search
CPC ...... G03B 21/14; G03B 21/208; G03B 17/00; G02B 26/0816; F21V 7/0083; G06F 11/324; F21L 4/04
USPC ............... 353/25; 348/159; 714/57; 362/183
See application file for complete search history.

(56) References Cited

U.S. PATENT DOCUMENTS

| | | |
|---|---|---|
| 5,668,537 A | 9/1997 | Chansky et al. |
| 6,761,470 B2 | 7/2004 | Sid |

(Continued)

FOREIGN PATENT DOCUMENTS

| | | | | |
|---|---|---|---|---|
| WO | 2007128317 A1 | 11/2007 | | |
| WO | WO 2007128317 A1 * | 11/2007 | ............. | G03B 17/00 |

(Continued)

OTHER PUBLICATIONS

International Search Report and Written Opinion dated May 20, 2014, in corresponding International Application No. PCT/US2013/061232, filed Sep. 23, 2013.

(Continued)

*Primary Examiner* — Kyung H Shin
(74) *Attorney, Agent, or Firm* — Downs Rachlin Martin PLLC (57) ABSTRACT

Disclosed is a control device for a serial network protocol controller configured to selectively disable control of a parameter of a controllable media device by at least one channel while the serial network protocol controller continues to transmit the at least one channel to the at least on serial network protocol controllable media device.

42 Claims, 7 Drawing Sheets

(51) Int. Cl.
  *G03B 21/20* (2006.01)
  *F21L 4/04* (2006.01)
  *G03B 17/00* (2006.01)
  *H05B 37/02* (2006.01)

(56) References Cited

U.S. PATENT DOCUMENTS

| | | |
|---|---|---|
| 2001/0000422 A1 | 4/2001 | Sid |
| 2002/0093296 A1 | 7/2002 | Belliveau |
| 2002/0176603 A1 | 11/2002 | Bauer et al. |
| 2004/0165379 A1 | 8/2004 | Waters |
| 2006/0109204 A1 | 5/2006 | Chen |
| 2009/0096993 A1* | 4/2009 | Velazquez .............. G03B 21/14 353/25 |
| 2009/0100452 A1 | 4/2009 | Hudgeons et al. |
| 2010/0107018 A1* | 4/2010 | Benenson ............. G06F 11/324 714/57 |
| 2010/0320940 A1 | 12/2010 | Salm et al. |
| 2010/0328465 A1* | 12/2010 | Merril ................ G02B 26/0816 348/159 |
| 2011/0031905 A1 | 2/2011 | Lin et al. |
| 2012/0033414 A1* | 2/2012 | Sharrah ..................... F21L 4/04 362/183 |

FOREIGN PATENT DOCUMENTS

| | | | |
|---|---|---|---|
| WO | 2011131198 A1 | 10/2011 | |
| WO | WO 2011131198 A1 * | 10/2011 | ............ F21V 7/0083 |

OTHER PUBLICATIONS

Extended European Search Report dated Mar. 31, 2016, in corresponding European Patent Application No. 13841446.1, filed on Mar. 27, 2015.

Office Action dated Apr. 11, 2017, in corresponding European Patent Application No. 13841446.1, which application was filed on Mar. 27, 2015.

Office Action dated Aug. 29, 2017, in corresponding U.S. Appl. No. 15/491,597, which application was filed Apr. 19, 2017.

* cited by examiner

CONTROL DEVICE, SYSTEM CONTAINING THE CONTROL DEVICE AND METHOD OF USING THE SAME

CROSS-REFERENCE TO RELATED APPLICATION

This application claims priority on U.S. provisional patent application No. 61/707,761, filed on Sep. 28, 2012 and U.S. provisional application No. 61/802,082, filed on Mar. 15, 2013.

BACKGROUND

1. Field of the Invention

This invention relates to the electrical arts. In particular, this invention relates to a control device for the control of at least one controllable media device, a system incorporating the control device and a method of using the control device.

2. Description of the Related Art

As media displays are not only becoming more elaborate and complex, but are becoming more commonplace, the control of the controllable media devices used in creating the displays must become more versatile. To this end, controllable media devices with automated and remotely controllable parameters are known in the entertainment and architectural lighting markets. Such media devices are commonly used in theaters, television studios, concerts, theme parks, night clubs and other venues. Representative controllable media devices include lighting devices, such as luminaires and dimmers, projection devices, video processors, audio devices, media servers, effects systems, such as fog machines, and the like. So, for example, a typical controllable lighting device will, at least, provide remote control over intensity, color, focus, beam pattern and zoom. Controllable lighting devices may further provide remote control over pan and tilt among other parameters. Similarly, a typical controllable projector will, at least, provide remote control over intensity, zoom, focus and input selection.

It is a difficulty in elaborate media displays, that the different controllable media devices are often controlled by different protocols. Today many controllable devices are controlled by command-based protocols, including the RS-232 protocol, a command-based protocol commonly used for projectors, video processors/switchers, and playback devices, the RS-422 protocol and, in particular, the Sony Decklink extended RS-422 protocol, commonly used to trigger playback devices, such as analog and digital VTR decks, media servers and the like, as well as certain Ethernet-based protocols.

It is also known to control certain controllable media devices through the industry standard state-based protocols, such as DMX-512. DMX-512 was developed by the United States Institute of Theatre Technology (USITT) in 1986 and has since been adopted and revised by the Entertainment Services and Technology Association (ESTA) as an ANSI standard, E1.11. This is an EIA RS-485 based serial network protocol designed to transmit 512 bytes of data (or channels) from a DMX-512 controller to a number of serially connected media device controllers.

A controllable media device controller that uses DMX-512 for control uses a number of discrete channels to control various media device parameters. Each controllable media device is designed by its manufacturer with a number of such controllable parameters that respond to a pre-defined mapping of the channels. Typically, the assignment mapping of DMX-512 channels to the internal control channels and hence to physical parameters is fixed within the media device. For example, channels 1 and 2 may control pan and tilt, 3 may control zoom and so on. Additionally, each of the channels has multiple levels, or amplitude settings, to produce different values for the parameters within the channels. The amplitude level on each channel can be set to one of up to 255 discrete levels. The mappings of the values within the channels to particular commands for a parameter are also fixed within the media device.

It is a drawback of such DMX-512 and other state-based protocol controllable devices, that the controller has control over all exposed parameters whether all the parameters are to be used or not. This results in the user often changing parameters that should not be modified. With a DMX-512 controllable projector, for example, the user may want control over only intensity and input selection, but not zoom or focus, so that a controller user will not inadvertently adjust parameters, that a projectionist may have spent hours manually setting.

A manufacturer may offer more than one such mapping selectable as a different "protocol mode" or "library" option. It remains a drawback, however, that the user cannot freely decide which parameters to use. It is a further drawback of this approach that the library file format is different for every brand/type of control requiring the media device controller include a large number of library files in order to support multiple media devices.

SUMMARY OF THE INVENTION

Now in accordance with one aspect of the invention, there has been discovered a control device for a state-based protocol controller, such as a DMX-512 protocol controller. The control device comprises a housing and at least one printed circuit board disposed in the housing. In some embodiments, the at least one printed circuit board, includes a central processing unit and a memory.

In one aspect, the control device is configured to control an output signal received from the state-based protocol controller, such as a DMX protocol signal. And in one aspect, the output signal is composed of a plurality of channels repeatedly transmitted, at least one of the plurality of channels for controlling a parameter of at least one controllable media device and the control device configured to selectively disable and/or enable control of the parameter of the at least one of the controllable media devices by the at least one channel while the state-based protocol controller continues to transmit the at least one channel to at least one controllable media devices.

In another aspect, the control device includes a state-based protocol inlet port, such as an XLR-5 inlet port, for communication with the state-based protocol controller, such as a DMX-512 protocol controller, and a state-based protocol outlet port, such as an XLR-5 outlet port, for communication with a state-based protocol controllable media device, such as a DMX-512 protocol controllable media device. In addition, in some embodiments, the control device includes at least one communication port for communication with a media device controllable by a protocol other than the state-based protocol. In some embodiments, the at least one additional communication port is a serial port, an Ethernet port or an MSTBA port and, in some embodiments, the protocol other than the state-based protocol is an RS232 protocol or an RS422 protocol.

In one embodiment, the control device includes a wireless Ethernet controller configured to provide control of the device via Wi-Fi or via a Local Area Network. And in some embodiments, the control device is configured to provide support for at least one of the ArtNet, PathportNe, ETCNet, MA-Net, MA-Net2, ACN, ANSI E1.31, ANSI E1.33, SLPv2 and ANSI E1.17 protocols. In another embodiment, the control device is configured with an embedded web server configured to provide control of the device via the Internet.

In some embodiments of the invention, the control device includes more than one Ethernet port. In some embodiments, the control device includes an Ethernet switch configured to control the more than one Ethernet port. And in some embodiments, the control device is configured to provide GPIO control of at least one of the state-based protocol controllable media devices and the command-based control media devices. In some embodiments, the control device includes at least one of an MSTBA or other communication port configured to support the GPIO control.

In some embodiments, the control device additionally includes a dedicated USB charging port disposed in the housing. And in some embodiments, the control device additionally includes a user interface device disposed in the housing for control of the device.

In some embodiments, the control device additionally includes a clock generator disposed in the housing. And in some embodiments, the control device supports MIDI Show Control and Midi time code extended protocols.

In accordance with one aspect of the invention, there has been discovered a media device control system which in addition to the control device comprises a state-based protocol controller and at least one state-based protocol controllable media device. In some embodiments, the state-based protocol controller is a DMX-512 protocol controller. And in some embodiments, the at least one media device is a lighting device, a projection device, a video processor, an audio device, a media server or an effects system device.

In accordance with another aspect of the invention, there has been discovered a control device for a serial network protocol controller, such as a DMX-512 protocol controller, configured to transmit an output signal composed of a plurality of channels repeatedly to at least one controllable media device, at least one of the plurality of channels for controlling a parameter of one of the at least one controllable media device. In some embodiments, the parameter is intensity, contrast control, gamma correction, input source selection, horizontal panning, vertical panning, tilt control, zoom in and out, control of the beam pattern, image freezing, focus control or color control.

In one aspect, the control device comprises a housing with a CPU and a memory disposed in the housing. And in one aspect, control device includes a serial network protocol inlet port, such as an XLR-5 inlet port, for communication with the serial network protocol controller, such as a DMX-512 protocol controller, and a serial network protocol outlet port, such as an XLR-5 outlet port, for communication with the at least one serial network protocol controllable media device, such as a DMX-512 protocol controllable media device. And in one aspect, the control device is configured to selectively disable and/or enable control of the parameter of the controllable media device by the at least one channel while the serial network protocol controller continues to transmit the at least one channel to the at least on serial network protocol controllable media device.

In one embodiment, the control device further comprises a wireless Ethernet controller configured to provide control of the device via Wi-Fi or via a Local Area Network. And in one embodiment, the Ethernet controller provides support for at least one of ANSI E1.31, Artnet, PathportNet, ETC-Net, MA-Net, MA-Net2 and ACN protocol. In another embodiment, the control device further comprises an embedded web server configured to provide control of the device via the Internet.

In an aspect of the invention, the control device further comprises at least one additional communication port for communication with a legacy media device controllable by a protocol other than the serial network protocol. In some embodiments, the at least one additional communication port is a serial port, and Ethernet port or an MSTBA port and in some embodiments, the protocol other than the serial network protocol is an RS232 or an RS422 protocol.

In accordance with one aspect of the invention, there has been discovered a media device control system which in addition to the control device comprises a serial network protocol controller and at least one serial network protocol controllable media device. In some embodiments, the serial network protocol controller is a DMX-512 protocol controller. And in some embodiments, the at least one media device is a lighting device, a projection device, a video processor, an audio device, a media server or an effects system device.

In accordance with another aspect of the invention, a method for controlling at least one parameter of a controllable media device comprises transmitting an output signal composed of a plurality of channels repeatedly to a control device operably connected to the controllable media device, where at least one of the plurality of channels is for controlling a parameter of the controllable media device. Representative parameters include, without limitation, contrast control, gamma correction, input source selection, horizontal panning, vertical panning, tilt control, zoom in and out, control of the beam pattern, image freezing, focus control and color control.

In one aspect, control of the parameter is selectively disabled using the control device, while continuing to transmit the at least one channel. And in one aspect, the output signal composed of the plurality of channels is repeatedly transmitted by a media device controller, such as a serial network protocol controller. Suitable serial network protocol controllers include, without limitation, DMX-512 protocol controllers, ANSI E1.31 protocol controllers, Artnet protocol controllers, PathportNet protocol controllers, ETCNet protocol controllers, MA-Net controllers, MA-Net2 protocol controllers and ACN protocol controllers.

And in an aspect of the invention, the method further comprises selectively enabling control of the disabled at least one parameter of the at least one controllable media device by the at least one channel of the plurality of channels using the control device, while continuing to transmit the at least one channel. In some embodiments, the selective enabling and disabling control of the parameter of the controllable media is by a graphical interface configured to selectively disable and/or enable control of the parameter of the controllable media device by the signal controller.

BRIEF DESCRIPTION OF THE DRAWINGS

The accompanying drawings, together with the specification, illustrate exemplary embodiments, and, together with the description, serve to explain the principles of these embodiments.

DETAILED DESCRIPTION OF THE PREFERRED EMBODIMENTS

Particular embodiments of the invention are described below in considerable detail for the purpose of illustrating its principles and operation. However, various modifications may be made, and the scope of the invention is not limited to the exemplary embodiments described below.

Disclosed is a media device control system comprising a state-based protocol controller, at least one device for controlling signals generated by the state-based protocol controller and a plurality of controllable media devices. In some embodiments, the media device control system additionally comprises a remote control unit. It is a distinct advantage of the invention that the control device is of use, not only with controllable media devices controlled by state-based protocols, such as the DMX-512 protocol, but by command-based protocols. For example, the control device is useful for configuration and control of RS-232 and RS-422 protocol controlled devices.

In one aspect, the control device is configured to transmit the output signal composed of a plurality of channels repeatedly based on any suitable standard state-based protocol, such as the DMX-512 protocol. Presently, a DMX-512 controller is configured to serially transmit up to 512 channels. In such aspects, at least one of the plurality of channels is for controlling a parameter of at least one DMX-512 controllable media device.

Details of the control device 10 are shown in FIGS. 1-4. The control device includes a housing 21. In the embodiment shown in FIGS. 1-4, the housing has a generally rectangular cross section with a top surface 22 (FIGS. 3 and 4), a bottom surface 23 (FIGS. 3 and 4), a front surface 24 (FIGS. 2 and 3), a back surface 26 (FIGS. 2 and 4) and opposing side surfaces 28 (FIGS. 1-4). In some aspects, the housing forms a rack mount box dimensioned to be mounted on a rack, such as a 19" rack (not shown) with screws (not shown) using flanges 30 (FIGS. 1-4).

In one aspect, disposed in the housing 21 is a main logic board 32 (FIGS. 1-3) comprising a central processing unit (CPU) and memory. In some embodiments, the CPU includes an Ethernet controller to provide a network interface for remote configuration and control of the controllable media devices via Wi-Fi or a Local Area Network (LAN). In the embodiment shown in FIG. 5, a wireless Ethernet module is included with the CPU to provide direct configuration and control of the controllable media devices using a remote control unit 89.

In still another embodiment, the central processing unit includes an embedded web server to provide a network interface for remote configuration and control of the controllable media devices via the Internet. The user can access the web server either with a user interface 60 on the control device (FIGS. 1-3) or with the remote control device 89.

In one aspect, a dedicated USB charging port 36 (FIGS. 1-3) extends through the front surface 22 of the housing 21 and is operably connected to the main logic board 32. The USB charging port is of especial use for charging mobile devices, such as the mobile devices used for remote control or configuration of the controllable control devices.

In another aspect, the control device 10 is configured to include at least one Ethernet port. In the representative embodiment shown in FIGS. 1-3, the control device includes three rear external Ethernet ports 46, one front external Ethernet port 48 and one internal Ethernet port 50. The external Ethernet ports can be used for remote configuration or control of any controllable media device connected to the Ethernet ports using a suitable protocol including without limitation, industry standard protocols, such as ArtNet, PathportNet, ETCNet, MA-Net, MA-Net2, ACN, ANSI E1.31, ANSI E1.33, SLPv2, ANSI E1.17 and the like. In some embodiments, the Ethernet ports are included as part of an Ethernet switch module, such as a gigabit Ethernet switch module 40 (FIGS. 1-3) disposed in the housing 21 of the signal control device 10 and in communication with the CPU.

Figure 1:
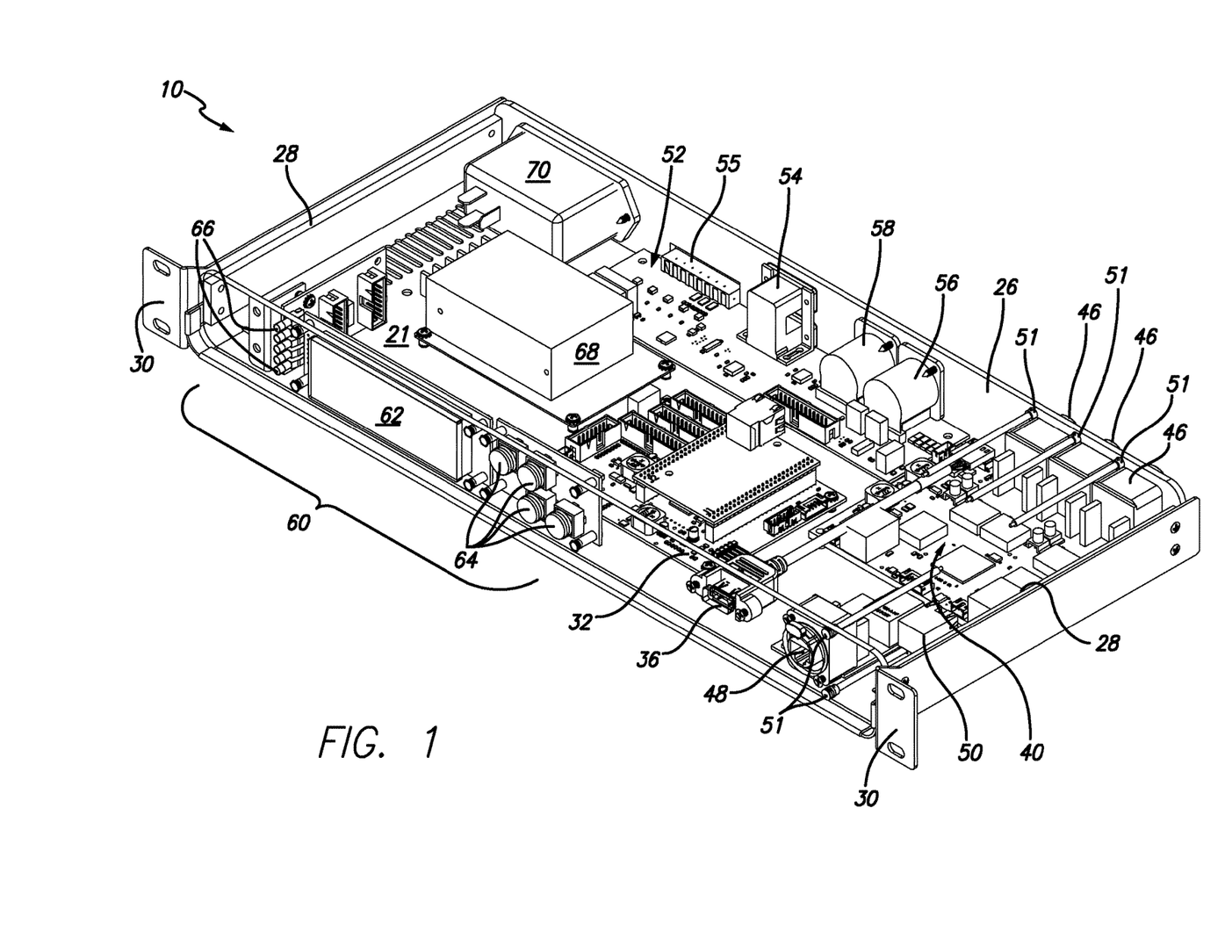
FIG. 1 is a top and front isometric view of one embodiment of a control device in accordance with the invention, with the top and front of the housing shown in phantom.
Figure 2:
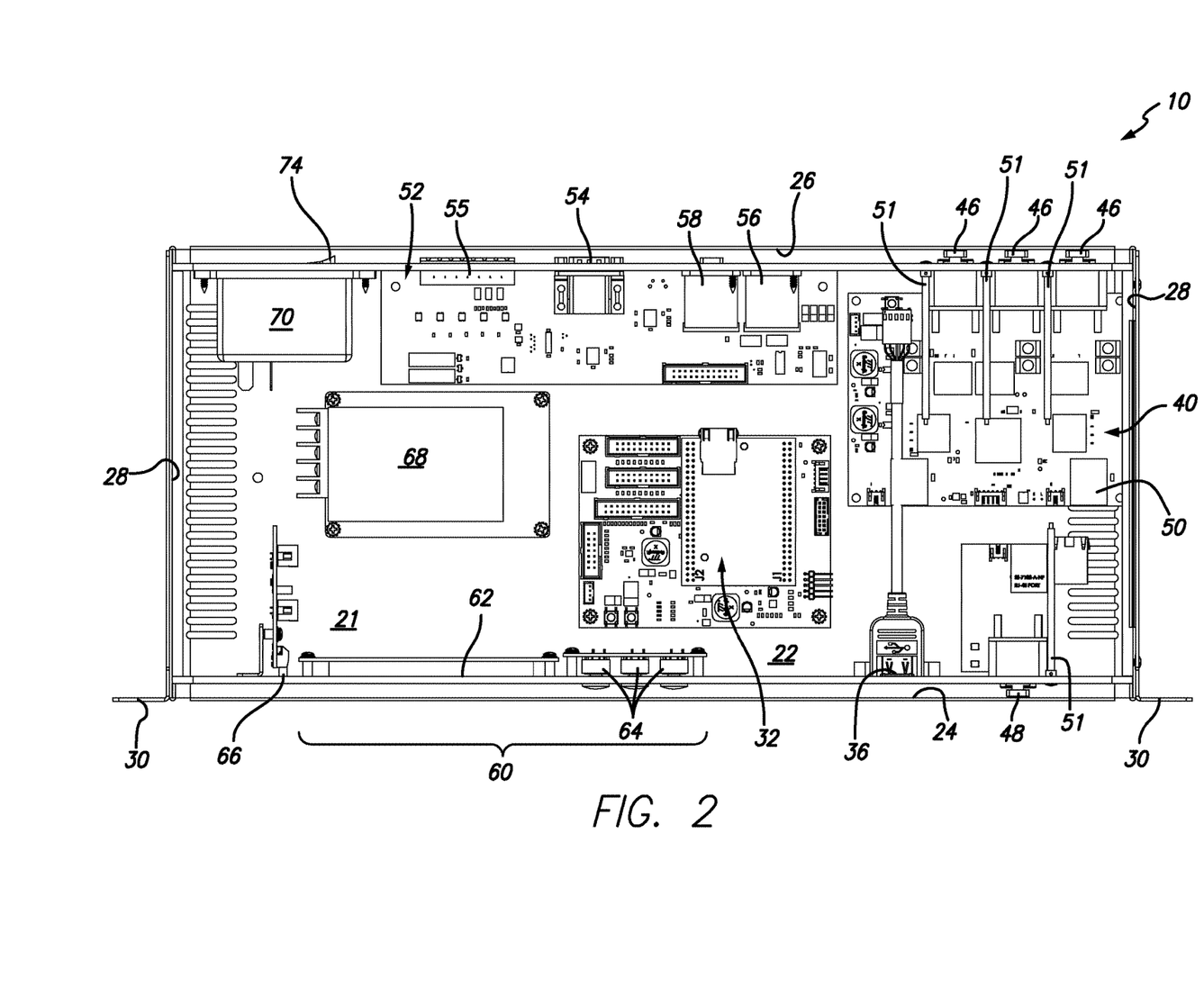
FIG. 2 is a top view of the control device shown in FIG. 1, with the top of housing shown in phantom.
Figure 3:
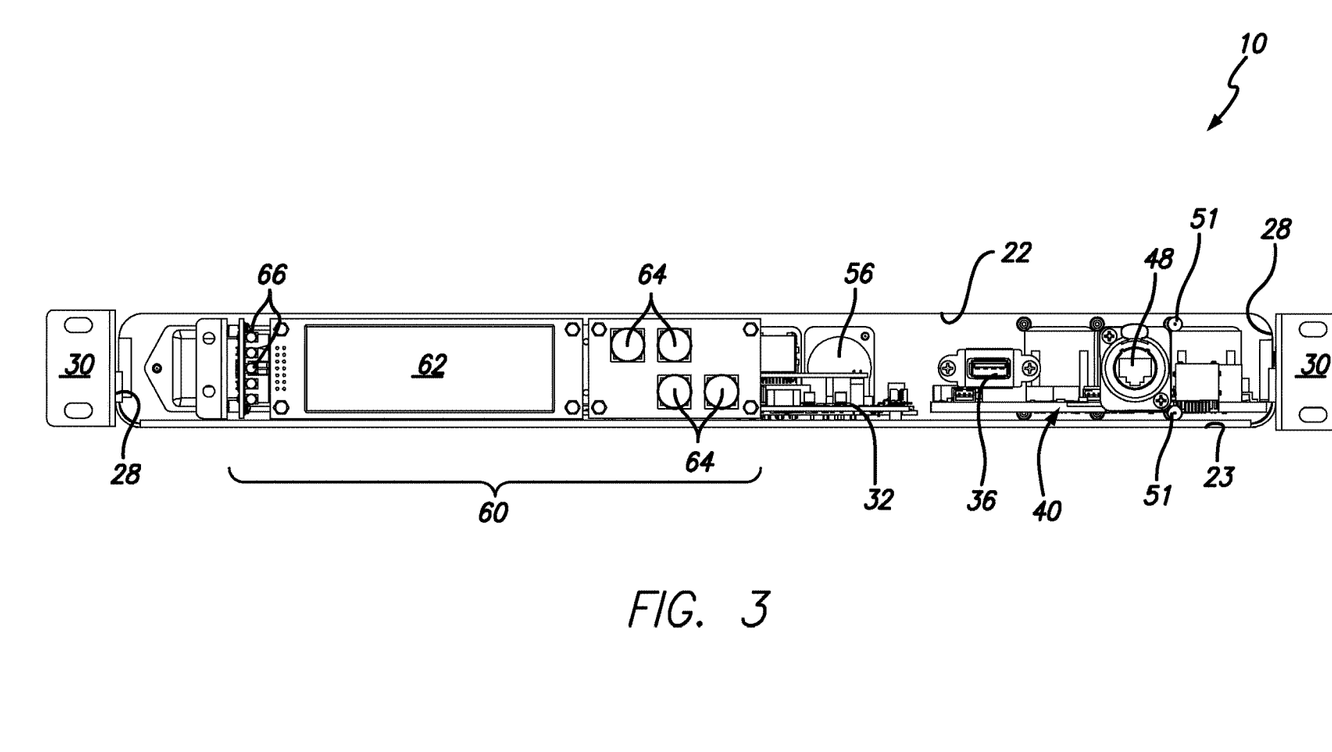
FIG. 3 is a front view of the control device shown in FIG. 1, with the front of housing shown in phantom.
Figure 4:
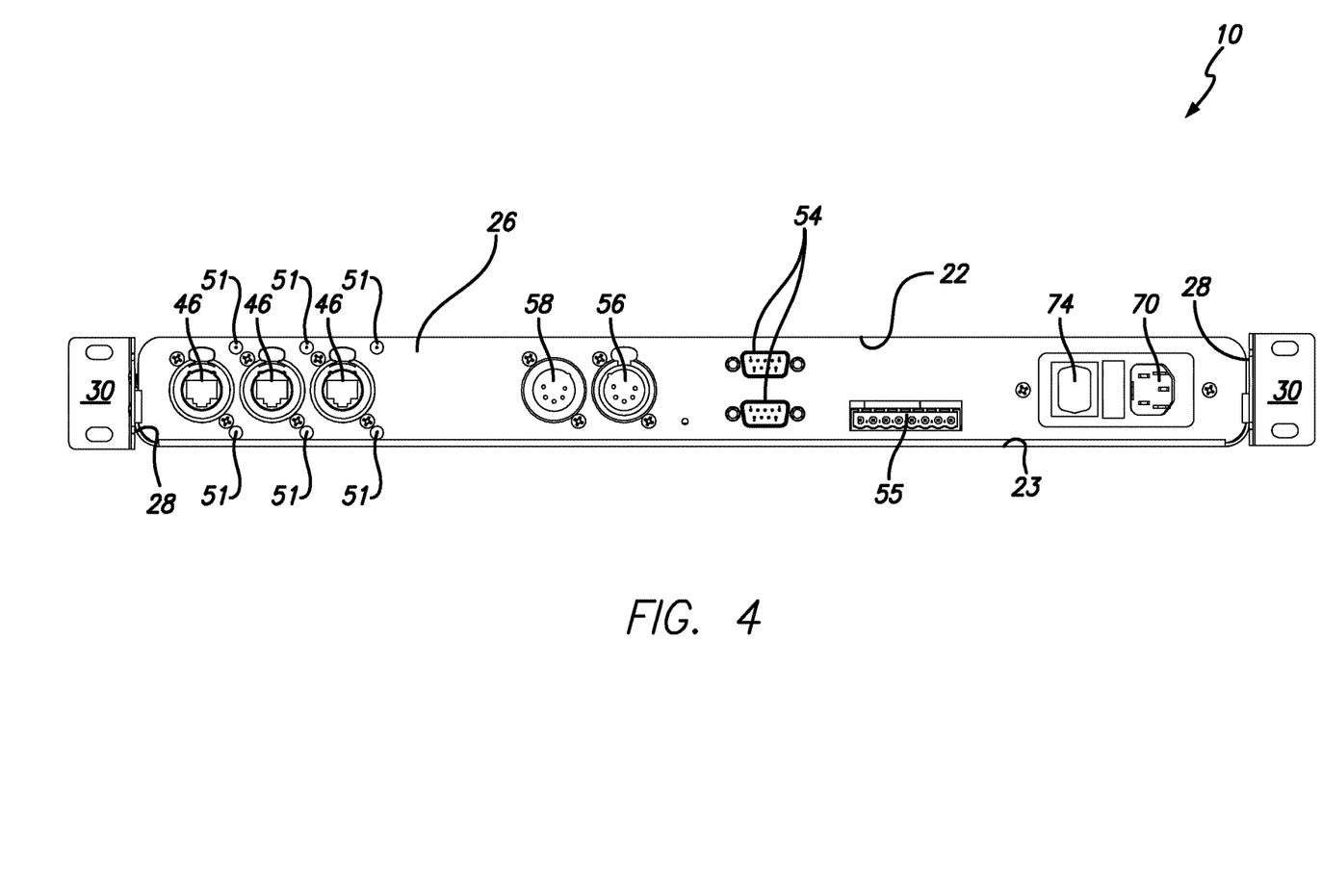
FIG. 4 is a back view of the control device shown in FIG. 1, with the back of housing shown in phantom.

Other embodiments of the control device 10 can include different numbers of Ethernet ports in different locations depending on the needs of the user. In some embodiments, the Ethernet switch module 40 includes a pair of status lights 51 positioned adjacent to each of the external Ethernet ports 46 and 48 for indicating whether data is being received or transmitted through the Ethernet ports.

In another aspect, the control device 10 is configured to include one or more additional communication ports for configuration and control of the media devices. In some embodiments, the additional communication ports are included as part of an input/output (I/O) module 52 disposed in the housing 21 of the control device 10 and in communication with the CPU.

In the representative embodiment shown in FIGS. 1-4, the I/O module includes two serial ports 54, and, in this embodiment, two DB-9 serial ports for supporting the RS232 protocol. The RS232 protocol is commonly used for projectors, video processors/switchers, playback devices and the like. Even when a media device does contain Ethernet connectivity, it is often desirable to use the serial port as it may require little or no configuration as opposed to the configuration that Ethernet connectivity often requires.

The representative I/O module 52 also includes an MSTBA communication port 55 for connection to controllable media devices configured and controlled using the RS422 protocol and, in particular, the Sony Decklink extended RS422 protocol. The Sony Decklink extended RS422 protocol is commonly used to trigger playback devices, such as analog and digital VTR decks, media servers and the like.

The representative I/O module 52 includes an XLR-5 inlet port 58 for connection to a DMX-512 controller and an XLR-5 outlet port 56 for connection to at least one controllable media device configured and controlled using the DMX-512 protocol and, in particular, to at least one controllable media devices configured and controlled using the RDM extended DMX-512 protocol. The DMX-512/RDM protocol is commonly used for lighting and show control. Show control provides real-time control over controllers and media devices connected to the other communication ports, i.e., connected to the Ethernet switching ports 46 and 48, the serial ports 54, and the MSTBA connection port 55. Show control enables protocol conversions between any physical port and any Ethernet-based protocol. This provides for, but is not limited to, the direct control of projector functions, video switching and processing, LED walls, playback devices and controlling any device that can be connected using any of the communication ports on the control device. In addition show control provides for the programming of triggers and actions based on events from scheduled dates or times, time-codes contact-closure or any other incoming signal. Additionally, DMX-512/RDM can be used to control other DMX-512 devices based on input coming from the DMX-512 ports.

In another aspect, the control device 10 is configured to provide support for general purpose input/output (GPIO). GPIO supports at least one input and output contact closure interface that enables the control device to directly control power to a device or system or a trigger a system that is able to accept contact closure inputs. The input and output contact closure interfaces provide complex triggering and control over media devices connected to the communication ports by taking a simple external input from switches, such as a musician's foot pedal or a motion sensor or a trigger on a mechanical system. In some embodiments, the control device includes at least one of an MSTBA or other communication port configured to support the GPIO control.

In another aspect, the control device is control device 10 is configured to support a clock generator disposed in the housing 21. The clock generator produces time codes to trigger events or synchronize the various controllable media devices. In some embodiments, the time code is an SMPTE time code.

In some embodiments, the control device 10 is configured to support MIDI Show Control and Midi time code extended protocols for linking control of different media devices. The control device can receive inputs and generate outputs to provide bridging control to and from any of the communication ports.

In still another aspect, disposed on the front surface 24 of the housing 21 of the control device 10 is a user interface 60 (FIGS. 1-3) by which a user can operate the control device and control and or configure the controllable media devices, as well as monitor their status. In some aspects, the user interface includes a display 62 (FIGS. 1 and 3), such as a touch screen display, including but not limited to an LCD touch screen display adapted to configure or control the control device as well as at least one of the media devices. In some further aspects, the user interface includes at least one mechanical switch, such as a DIP switch, operably connected to the CPU. In the representative embodiment shown in FIGS. 1-3, a plurality of push buttons 64 (four shown in the representative FIGS. 1-3) are adapted to configure or control the control device as well as at least one of the media devices. In some aspects, the user interface additionally includes a plurality visible indicators 66 (FIGS. 1 and 3) including lights such as LED lights to indicate the status of the various configuration and control features.

In some aspects, the control device 10 includes a power supply 68 (FIGS. 3 and 4) for supplying power to all of the electrical components of the control device (FIGS. 3, 4 and 6), a power cord receptacle 70 to receive a power cord (not shown) for supplying electricity to the control device and on off control switch 74 (FIGS. 4 and 6) for controlling the flow of electricity to the power supply.

Figure 5:
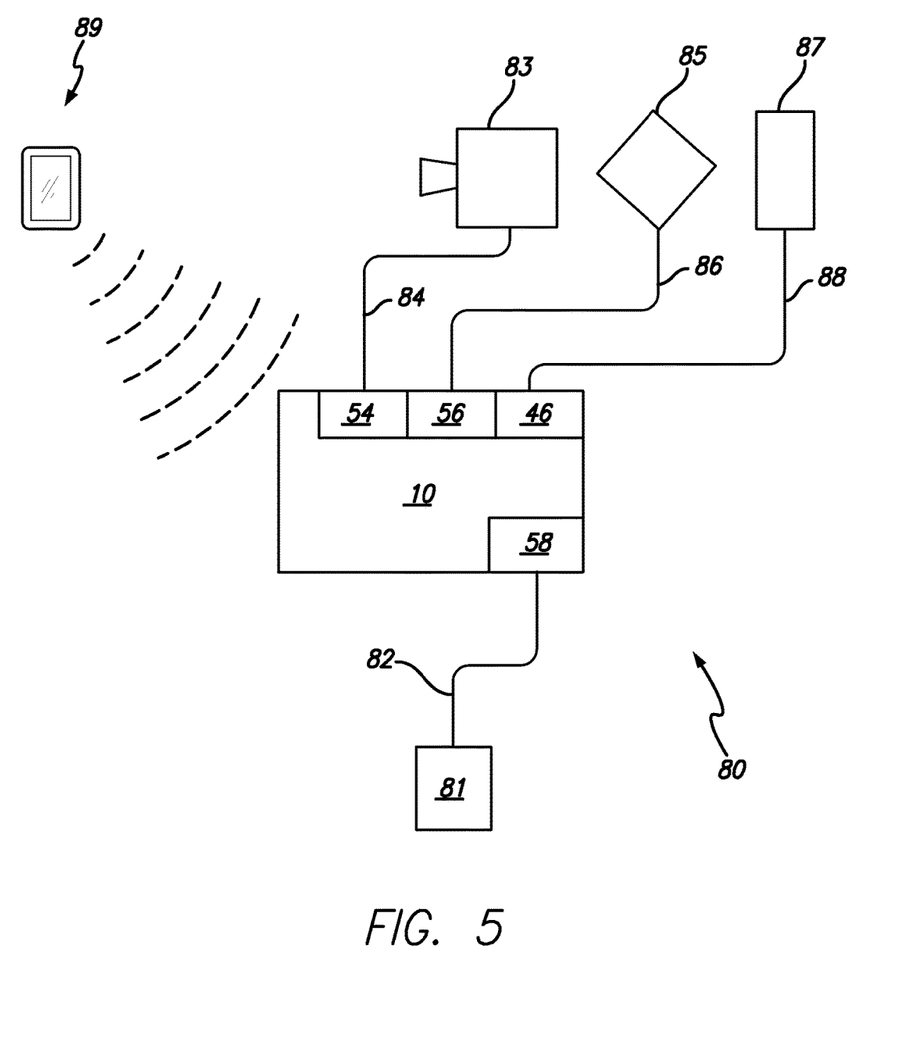
FIG. 5 is a schematic illustration of a first embodiment of a media device control system including a control device connected to a plurality of controllable media devices.

FIG. 5 is a schematic illustration of one aspect or the invention; a media control system 80 comprising a serial network protocol controller 81 configured to transmit an output signal composed of a plurality of channels repeatedly to the control device 10, at least one of the plurality of channels for controlling a parameter of the at least one controllable media device. In the representative embodiment shown in FIG. 5, the serial network protocol controller is operably connected to the DMX-512 input port 58 of the control device using a suitable DMX-512 connection cable 82.

The control device 10, in turn, is operably connected to a plurality of controllable media devices. Representative media devices include, without limitation, lighting devices, such as luminaires and dimmers, projection devices, video processors, audio devices, media servers, effects systems, such as fog machines and the like. For example, in the embodiment shown in FIG. 5, a projector 83 is connected to one of the serial ports 54 using a suitable RS-232 connection cable 84, a lighting device 85 is connected to the DMX-512 outlet port 56 using a suitable DMX-512 connection cable 86 and a media server 87 is connected to one of the external Ethernet ports 46 using an Ethernet cable 88. While a first controllable media device 83, a second controllable media device 85 and a third controllable media device 87 are shown in FIG. 5 one or more controllable media devices can be connected to the control device according to the particular needs of a user.

The remote control unit 89 can be any suitable device. Representative remote control units include smart phones, such an Apple's iPhone.

It is a distinct advantage of the invention that the control unit can be used to configure a wide range of media devices, including DMX-512 protocol controlled media devices, such as lighting devices, including as luminaires and dimmers, projectors, video processors, audio devices, video devices, including video processors/switchers, and playback devices, including analog and digital VTR decks, media servers, effects systems, including fog machines, LED walls and the like.

Additionally, the control unit 10 can be used to configure and control a wide range of parameters. For example, every DMX-512 controllable media device is designed by its manufacturer to include a predefined number of controllable parameters. Representative parameters for a DMX-512 controllable video processing device include, without limitation, contrast, gamma correction, input source selection, horizontal panning, vertical panning, tilt, zoom in and out, beam pattern, image freezing, focus, color and the like. Representative parameters, for a DMX-512 controllable projector will, at least, provide remote control over intensity, zoom, focus and input selection. Additionally, the values within the channels to particular commands for a parameter are fixed within a media device.

Figure 6:
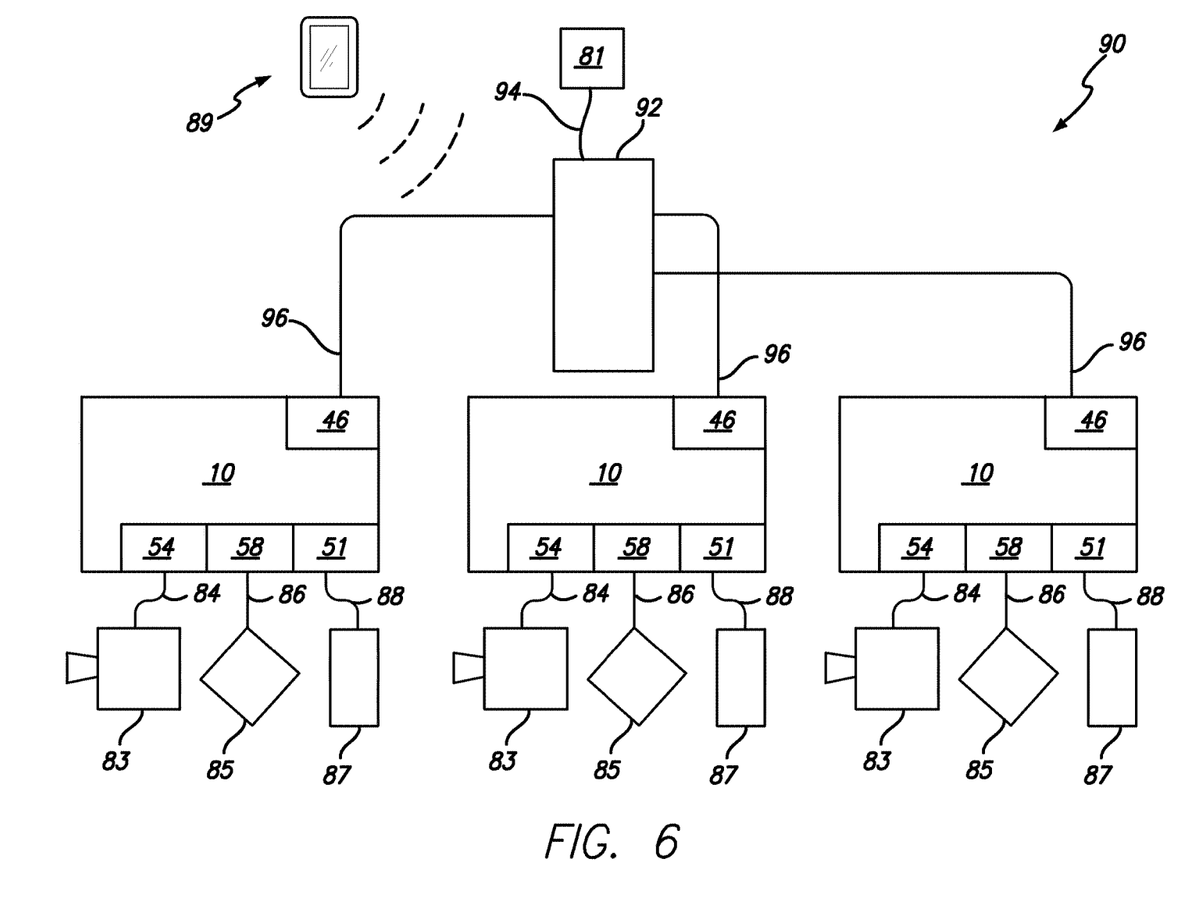
FIG. 6 is a schematic illustration of a second embodiment of a media device control system including three control devices, each control device connected to a plurality of controllable media devices.

In an alternative embodiment shown in FIG. 6, a media device control system 90 comprises a serial network protocol controller 81 operably connected to a single network access point 92 via an Ethernet cable 94. Each of a plurality of control devices 10 is connected to the single network access point to form a local area network. In some embodiments, the control devices are connected by Ethernet cables 96 to the single network access point via the external Ethernet ports 46 on each of the control devices. In other embodiments, the network access point can be connected to the control devices using different types of cables and ports or they can be connected wirelessly. While three control devices and three controllable media devices connected to each of three control devices are shown in the representative embodiment of FIG. 6, one or more controllable media devices can be connected to one or more control devices according to the particular needs of a user. The control device can configure and control each controllable media device independently or in combination, using the remote control unit 89.

In some embodiments, the control device is configured to identify the particular channel or channels that are controllable by a DMX-512 protocol controller. In one embodiment, the central processing unit is configured to identify the particular channel or channels that are controllable by the DMX-512 protocol controller. In another embodiment, the control device includes a separate integrated circuit, processor, logic unit or the like configured to identify the particular channel or channels that are controllable by the DMX-512 protocol controller.

In some embodiments, the control device is configured to include a DMX-512 signal mute. The DMX-512 signal mute selectively enables and disables control of at least one channel while allowing the DMX-512 controller to continue to transmit the at least one channel on to the control device. In some aspects, the control device is configured to selectively disable and/or enable control of the parameter of the at least one channel by the DMX-512 protocol controller while allowing the DMX-512 protocol controller to continue to transmit the at least one channel to the control device.

In one aspect, the control device 10 is configured to selectively disable and/or enable control of the parameter by causing the control device to ignore the at least one channel. And in one aspect, the control device is configured with a static default value for each disabled channel, such that if a different value is entered for that channel, the incoming value is ignored and the at least one device continues to use the static value.

In another aspect, the control device 10 includes software or firmware for selectively controlling the mute, the software or firmware implemented through an IOS, Windows, Linux, including Android, or similar operating system user interface.

It is a benefit of control device 10 configured with a mute in accordance with the invention that the selectively disabled parameters can then be controlled by another method, such as manually controlled or controlled by another command protocol. For example, in an exemplary embodiment, the DMX controllable media device is a projector. The DMX-512 protocol controller output signal includes a plurality of channels for controlling parameters such as intensity, input selection, zoom and focus. Using the control device in accordance with this aspect of the invention, the channels for intensity and input selection can be enabled, i.e., be controllable by a DMX-512 protocol controller, while control of the channels for zoom and focus by the media device controller can be disabled, so that the zoom and focus can be manually controlled by the user or by a command protocol.

In another exemplary embodiment of the invention, the serial network protocol controller can be configured to transmit an output signal to a controllable lighting device. The output signal can include, for example, a plurality of channels for controlling parameters, such as intensity, color, focus, beam pattern, zoom, pan and tilt. Using the control device in accordance with this aspect of the invention, the channels for focus, beam pattern, zoom, pan, and tilt can be enabled, to provide for ready control by the controller. Simultaneously, the channels for intensity and color can be disabled to cause the device to ignore any data received for that channel and prevent the user from inadvertently changing the value for the parameter otherwise controllable by that channel. It is a benefit of such a control device that, when enabled, the possibility of inadvertently changing the value of a parameter is minimized or eliminated.

Turning now to the method of operation, in one aspect, a method for controlling at least one parameter of a controllable media device comprises transmitting an output signal composed of a plurality of channels repeatedly to a control device operably connected to the controllable media device, where at least one of the plurality of channels is for controlling a parameter of the controllable media device. Representative parameters include, without limitation, contrast control, gamma correction, input source selection, horizontal panning, vertical panning, tilt control, zoom in and out, control of the beam pattern, image freezing, focus control and color control.

Control of the parameter is selectively disabled using the control device, while continuing to transmit the at least one channel. In one aspect, the output signal composed of the plurality of channels is repeatedly transmitted by a media device controller, such as a serial network protocol controller. Suitable serial network protocol controllers include, without limitation, DMX-512 protocol controllers, ANSI E1.31 protocol controllers, Artnet protocol controllers, PathportNet protocol controllers, ETCNet protocol controllers, MA-Net controllers, MA-Net2 protocol controllers and ACN protocol controllers.

And in an aspect of the invention, the method further comprises selectively enabling control of the disabled at least one parameter of the at least one controllable media device by the at least one channel of the plurality of channels using the control device, while continuing to transmit the at least one channel. In some embodiments, the selective enabling and disabling control of the parameter of the controllable media is by a graphical interface configured to selectively disable and/or enable control of the parameter of the controllable media device by the signal controller.

Figure 7A:
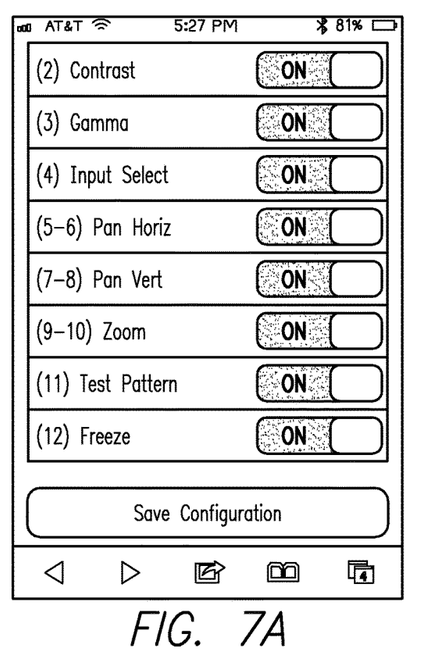
FIGS. 7A and 7B are diagrammatic views of a user interface before and after selective disabling of a plurality of channels.
Figure 7B:
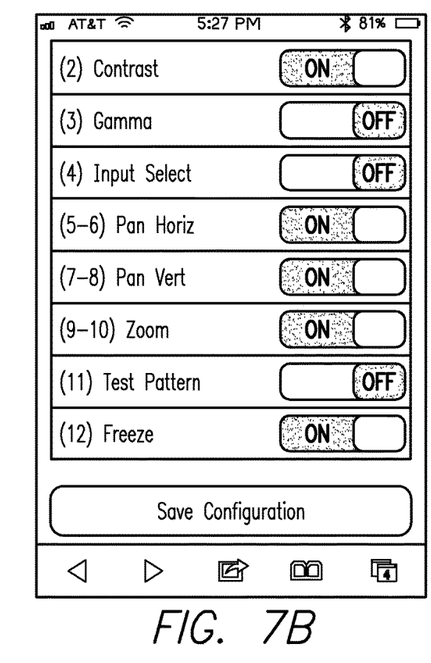

In some aspects, the user can control operation of at least one control device on a channel-by-channel basis using a graphical user interface. Shown in FIG. 7A is a diagrammatic representation of an IOS interface on the remote control having a menu showing channels 2-12 of the media device controller enabled to control, contrast, gamma, input selection, horizontal, respectively. Shown in FIG. 7B is the menu after the appropriate boxes on the user interface have been clicked to disable gamma, input selection, and test pattern.

In the foregoing specification, various aspects of the invention have been described with reference to specific exemplary embodiments. Various modifications and changes may be made, however, without departing from the scope of the present invention. The specification and figures are illustrative, rather than restrictive, and modifications are intended to be included within the scope of the present invention. Accordingly, the scope of the invention should be determined by the claims and their legal equivalents rather than by merely the examples described. With regard to particular embodiments described above, any benefit, advantage, solution to a problem, or any element that may cause any particular benefit, advantage, or solution to occur or to become more pronounced are not to be construed as critical, required, or essential features or components of any or all the claims.

We claim:
1. A control device, comprising:
   a housing;
   at least one printed circuit board disposed in the housing, the at least one printed circuit board including a central processing unit and a memory and the at least one printed circuit board configured to control an output signal received from a state-based protocol controller, the output signal including a plurality of channels;

a state-based protocol inlet port configured to communicate with the state-based protocol controller, an outlet port configured to communicate with a state-based or command-based protocol controllable media device, the media device having a parameter, wherein one of the channels is configured to control the parameter, and;

wherein the central processing unit is configured to perform operations comprising:

receiving a user selection to disable control of the parameter by the state-based protocol controller;

receiving, from the state-based protocol controller, a first value for the one of the channels configured to control the parameter; and sending, to the media device, a second value for control of the parameter that is different than the first value.

2. The control device of claim 1 further comprising a wireless controller configured to provide control of at least one of the state-based protocol controllable media device or the command-based protocol device via a Local Area Network.

3. The control device of claim 2 wherein the control device is configured to support at least one of ArtNet, PathportNet, ETCNet, MA-Net, MA-Nett, ACN, ANSI E1.31, ANSI E1.33, SLPv2 or ANSI E1.17 protocols.

4. The control device of claim 1 further comprising an embedded web server configured to provide control of at least one of the state-based protocol controllable media device or the command-based protocol device via the Internet.

5. The control device of claim 1 wherein the state-based protocol controllable media device is configured for a DMX-512 protocol.

6. The control device of claim 1 wherein the outlet port is a serial port or an Ethernet port.

7. The control device of claim 1 wherein the media device includes the command-based protocol controllable media device, the command-based protocol controllable media device is-configured for at least one of RS-232 or RS-422 communication.

8. The control device of claim 1 further comprising more than one Ethernet port.

9. The control device of claim 8 further comprising an Ethernet switch configured to control the more than one Ethernet port.

10. The control device of claim 1, wherein the control device is further configured to provide GPIO control of at least one of the state-based and command-based protocol controllable media device.

11. The control device of claim 10 further comprising at least one communication port configured to support the GPIO control.

12. The control device of claim 1 further comprising a dedicated USB charging port disposed in the housing.

13. The control device of claim 1 further comprising a clock generator disposed in the housing.

14. The control device of claim 1 wherein the inlet port and outlet port are part of a input/output module, the input/output module configured to support at least one of MIDI Show Control or Midi time code extended protocols.

15. The control device of claim 1 further comprising a user interface device disposed in the housing, the user interface for control of the control device.

16. The control device of claim 1, wherein the sending step includes sending the second value with a command-based protocol communication.

17. A control device for a DMX-512 protocol controller configured to transmit an output signal composed of a plurality of channels, the control device comprising:

a housing;

at least one printed circuit board disposed in the housing, the at least one printed circuit board including a central processing unit and a memory and the at least one printed circuit board configured to control output signals received from the DMX-512 protocol controller;

a wired or wireless controller or an embedded web server configured to provide control of the control device, the control device configured to support at least one of ArtNet, PathportNet, ETCNet, MA-Net, MA-Net2, ACN, ANSI E1.31, ANSI E1.33, SLPv2 or ANSI E1.17 protocols;

an inlet port configured to communicate with the DMX-512 protocol controller;

an outlet port configured to communicate with a DMX-512 or command-based protocol controllable media device, the media device having a parameter, wherein one of the plurality of channels is configured to control the parameter;

at least one serial port;

a plurality of Ethernet outlet ports;

an Ethernet switch configured to control the plurality of Ethernet outlet ports;

a clock generator disposed in the housing; and a user interface for control of the control device disposed in the housing, wherein the control device is configured to selectively disable control of the parameter by the DMX-512 protocol controller by providing a second value to the media device for control of the parameter, the second value different than a value for the one of the plurality of channels received by the control device from the DMX-512 protocol controller for control of the parameter.

18. The control device of claim 17 wherein the control device is configured to support at least one of RS-232, RS-422, MIDI Show Control or Midi time code extended protocols.

19. The control device of claim 17 further comprising a dedicated USB charging port disposed in the housing.

20. A media device control system comprising:

a state-based protocol controller that provides an output signal that includes a plurality of channels, a control device operably connected to the state-based protocol controller, and at least one state-based or command-based protocol controllable media device having one or more parameters controllable by corresponding ones of the plurality of channels, the control device comprising:

a housing;

at least one printed circuit board disposed in the housing, the at least one printed circuit board including a central processing unit and a memory and the at least one printed circuit board configured to control an output signal received from the state-based protocol controller;

a state-based protocol inlet port configured to communicate with the state-based protocol controller, and an outlet port configured to communicate with the at least one state-based or command-based protocol controllable media device wherein the control device is configured to selectively disable control of the one or more parameters by the state-based protocol controller by providing a different value to the at least one controllable media device for control of a disabled one of the parameters than a value received by the control device from the state-based protocol controller.

21. The media device control system of claim 20 wherein the state-based protocol controller is a DMX-512 protocol controller.

22. The media device control system of claim 20 wherein the control device further comprises a wireless Ethernet controller configured to provide control of the control device via Wi-Fi or via a Local Area Network.

23. The media device control system of claim 20 wherein the control device further comprises an embedded web server configured to provide control of the control device via the Internet.

24. The media device control system of claim 20 wherein the outlet port is a serial port or an Ethernet port.

25. The media device control system of claim 20 wherein the at least one state-based or command-based protocol controllable media device includes a command-based protocol controllable media device is-configured for at least one of RS-232 or RS-422.

26. The control device of claim 20 further comprising more than one Ethernet port.

27. The control device of claim 26 further comprising an Ethernet switch configured to control the more than one Ethernet port.

28. The media device control system of claim 20 wherein the control device is configured to support at least one of ArtNet, PathportNet, ETCNet, MA-Net, MA-Nett, ACN, ANSI E1.31, ANSI E1.33, SLPv2 or ANSI E1.17 protocol.

29. The media device control system of claim 20 wherein the control device is further configured to provide for GPIO control of the at least one of the state-based or command-based protocol controllable media device.

30. The media device control system of claim 29 further comprising at least one communication port configured to support the GPIO control.

31. The media device control system of claim 20 wherein the control device further comprises a dedicated USB charging port disposed in the housing.

32. The media device control system of claim 20 wherein the control device further comprises a clock generator disposed in the housing.

33. The media device control system of claim 20 wherein the control device is configured to support at least one of MIDI Show Control or Midi time code extended protocols.

34. The media device control system of claim 20 wherein the control device further comprises a user interface disposed in the housing, the user interface for control of the control device.

35. The media device control system of claim 20 wherein the at least one state-based or command-based protocol controllable media device is a lighting device, a projection device, a video processor, an audio device, a media server or an effects system device.

36. The media device control system of claim 20, further comprising a remote control unit operably connected to the control device and configured to display a graphical user interface (GUI), the GUI including a menu of the one or more parameters and corresponding control elements, wherein the control elements are operable by a user of the GUI between an enable position, wherein the remote control unit instructs the control device to enable control of a corresponding one of the one or more parameters by the state-based protocol controller, and a disable position, wherein the remote control unit instructs the control device to perform the disabling of control of the corresponding one of the one or more parameters by the state-based protocol controller.

37. The media device control system of claim 20 wherein the different value is a value manually entered by a user at a user interface operably controlled to the control device.

38. The media device control system of claim 20 wherein the different value is provided by a command-based protocol device operably connected to the control device.

39. A media device control system comprising:
    a DMX-512 protocol controller that provides an output signal that includes a plurality of channels, a control device operably connected to the DMX-512 protocol controller, and at least one DMX-512 or command-based protocol controllable media device having one or more parameters controllable by corresponding ones of the plurality of channels,
    the control device comprising:
        a housing;
        at least one printed circuit board disposed in the housing, the at least one printed circuit board including a central processing unit and a memory and the at least one printed circuit board configured to control output signals received from the DMX-512 protocol controller;
        a wired or wireless controller or an embedded web server configured to provide control of the control device, wherein the control device is configured to support at least one of ArtNet, PathportNet, ETCNet, MA-Net, MA-Net2, ACN, ANSI E1.31, ANSI E1.33, SLPv2 or ANSI E1.17 protocols;
        an inlet port configured to communicate with the DMX-512 protocol controller,
        an outlet port configured to communicate with the at least one DMX-512 or command-based protocol controllable media device;
        at least one of a serial port or an MSTBA port;
        a plurality of Ethernet outlet ports;
        an Ethernet switch configured to control the plurality of Ethernet outlet ports;
        a clock generator disposed in the housing; and
        a user interface disposed in the housing
    wherein the central processing unit is configured to perform operations comprising:
        receiving a user selection to disable control of one of the parameters by the DMX-512 protocol controller;
        receiving, from the DMX-512 protocol controller, a first value for one of the plurality of channels configured to control the user-selected parameter; and
        sending, to the media device, a second value for control of the user-selected parameter that is different than the first value.

40. The media device control system of claim 39 wherein the control device is configured to support at least one of RS-232, RS-422, MIDI Show Control or Midi time code extended protocols.

41. The media device control system of claim 39 wherein the control device further comprises a dedicated USB charging port disposed in the housing.

42. The media device control system of claim 39 wherein the at least one DMX-512 or command-based protocol controllable media device is a lighting device or a projection device.

* * * * *